March 12, 1968  F. J. LOWES  3,372,430
DEVICE FOR THE GENERATION OF SURFACES OF REVOLUTION
Filed Oct. 29, 1965
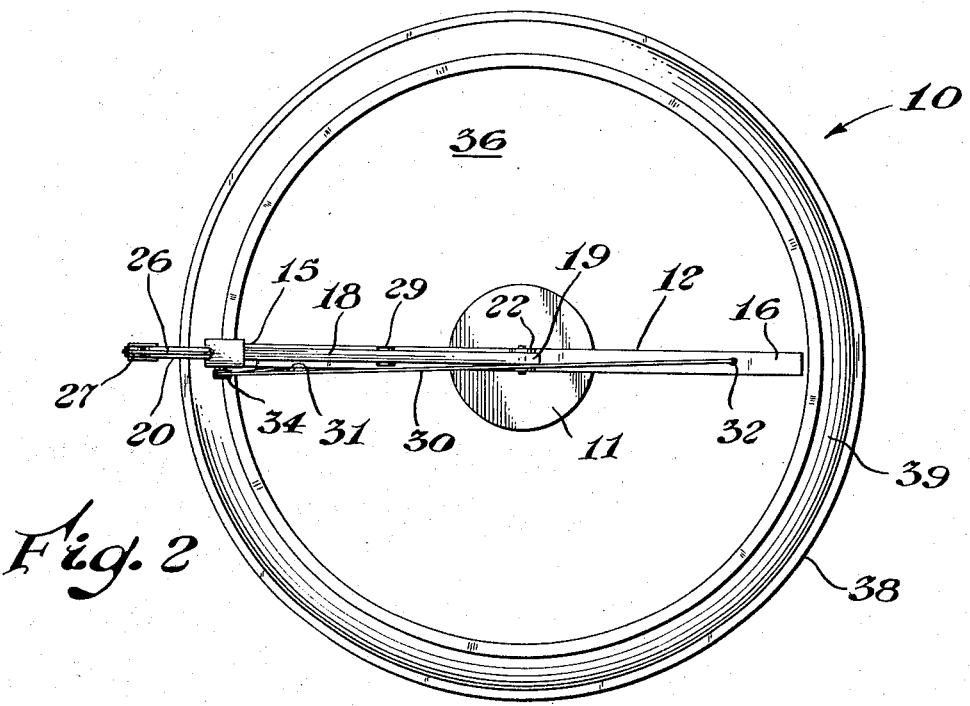
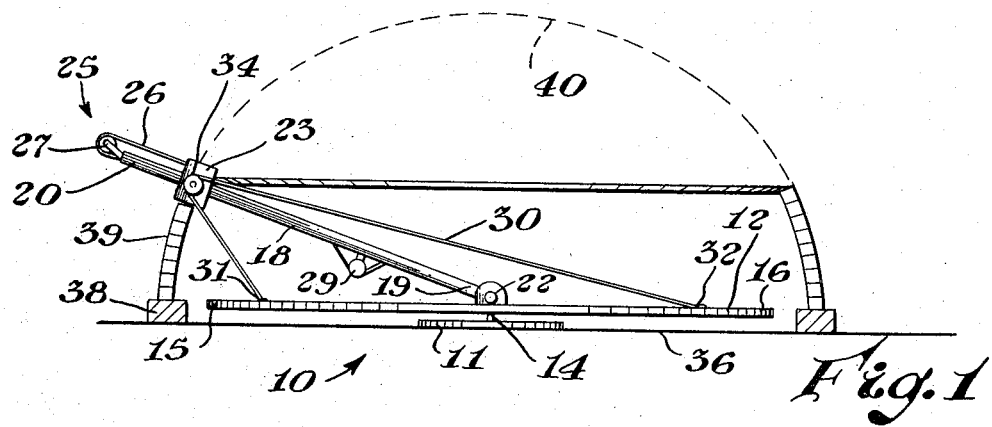
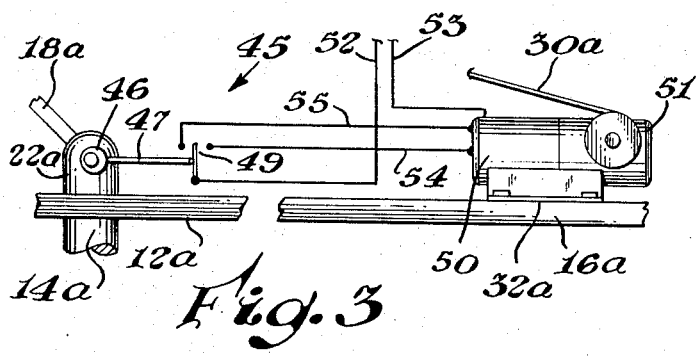
INVENTOR.
Fred J. Lowes
BY
AGENT 3,372,430
DEVICE FOR THE GENERATION OF
SURFACES OF REVOLUTION
Fred J. Lowes, Midland, Mich., assignor to The Dow
Chemical Company, Midland, Mich., a corporation of
Delaware
Filed Oct. 29, 1965, Ser. No. 505,671
6 Claims. (Cl. 18—5)

This invention relates to an apparatus for the preparation of surfaces of revolution and more particularly relates to an apparatus which is particularly suited for the preparation of elliptical and like structures.

Buildings and similar constructions are prepared by assembling bricks or plastic foam as disclosed in Belgian Patent 612,405 employing a generally centrally disposed mast or pivot and depositing the building material from a dispensing or assembling head secured to a centrally disposed pivot. For example, a hemispherical dome is readily generated by securing a boom or like member to a pivot and rotating the boom above the periphery of the structure to be generated and disposing successive layers of construction material until the desired hemispherical surface is achieved. Oftentimes it is undesirable to prepare a hemispherical dome as in practice this will sometimes result in a waste of construction material and an undesired overhead space, therefore, frequently it is desirable to prepared domes which are other than spherical and oftentimes it is desired to prepare enclosures or circular structure having an elliptical cross section and beneficially oftentimes it is desired to construct a circular structure with an irregular curving cross section.

It is an object of this invention to provide an improved apparatus for the preparation of structures of circular configuration and non-spherical nature.

It is a further object of the invention to provide an apparatus for the preparation of circular structures having an elliptical cross sectional configuration.

It is a further object of the invention to provide an apparatus for the construction of structures of generally circular configuration and having an irregularly curving cross section.

These benefits and other advantages of the invention are achieved in an apparatus for the preparation of structures of circular cross section which comprises in cooperative combination a means for guiding the deposition of building material in a generally dome-like configuraton having a centrally pivoting arm which is adapted to be pivoted within a solid angle which is generally commensurate with the surface of the desired structure, the improvement which comprises a material dispensing head slidably mounted upon the arm, a cable secured to a base supporting the arm, the base being rotatable about the axis of generation of the structure, the cable being secured to the base at at least two spaced apart locations and being movably secured to the material dispensing head.

Further features and advantages of the present invention will become more apparent when taken in accordance with the specification and drawing wherein:

FIGURE 1 is a schematic representation of a side view of an apparatus in accordance with the invention;

FIGURE 2 is a top view of the apparatus of FIGURE 1; and

FIGURE 3 depicts a modification of the apparatus of FIGURE 1.

In FIGURE 1 there is schematically illustrated an apparatus for the preparation of structures having a circular cross section, the apparatus being generally designated by the reference numeral 10. The apparatus 10 comprises a base 11, a base arm or pivoting arm 12 pivotally secured to the base 11 by means of the pivot 14. The base arm 12 has a first end 15 and a second end 16, both ends remotely disposed from the pivot 14. A centrally pivoting arm or operating arm 18 having a first end 19 and a second end 20 is pivotally secured to the arm 12 by means of a pivot 22 disposed generally at the location of the pivot 14. The pivot 22 has its pivotal axis disposed in a plane generally normal to the longitudinal axis to the arm 12 and normal to the axis of the pivot 14. An operating head 23 is slidably disposed upon the arm 18 and adapted to move longitudinally thereon. A tension means generally indicated by the reference numeral 25 is in operative connection with the arm 18 and the operating head 23. The tensioning means 25 comprises a cable 26 passing over a sheave 27 pivotally attached to the second end 20 of the arm 18. The cable 26 passes through the arm 18 toward the first end 19 to a cable tensioning device 29 which beneficially serves as a counterweight for the operating head 23 and may be a spring tensioned drum or an electric motor. A second cable 30 is affixed to the arm 12 at points 31 and 32 remotely disposed from the pivot 22 and spaced equidistant therefrom. The cable 30 passes over a sheave or pulley 34 affixed to the operating or material dispensing head. The base 11 is supported by a surface 36 which also supports a foundation or footing 38 of a circular nature. A building portion 39 of circular configuration is supported upon the footing 38. The dotted line designated by the reference numeral 40 indicates the general outline of the completed building of generally elliptical configuration as viewed in FIGURE 1.

In operation of the apparatus as depicted in FIGURES 1 and 2, the material dispensing head 23 or a foam joining apparatus such as disclosed in the Belgian Patent 612,405 is slidably disposed upon the arm 18. The length of the cable 30 is selected to be of such size that on rotation of the arm 18 about the pivot 22 the head 23 traces a generally elliptical path or portion of ellipse as the arm pivots. The tensioning means 25 applies sufficient force to the head 23 to maintain the cable 30 taut. Suitable building material is supplied to the head 23 and the arm 12 rotated at a desired rate, depositing the material upon the footing such as the footing 38. As the arm 12 rotates about the pivot 14, building material deposits and is built up in a plurality of layers such as shown in the structure portion 39 and the resultant structure assumes a generally ellipsoidal configuration. The apparatus 10, on completion of the building, is then disassembled and removed.

In FIGURE 3 there is schematically illustrated a fractional view of a modification of the apparatus of the invention generally designated by the reference numeral 45. The apparatus 45 has a pivot 14a corresponding to the pivot 14 of FIGURES 1 and 2, an arm 12a having disposed thereon a pivot 22a and an arm 18a. Affixed to the arm 18a is a cam 46. A cam follower 47 is in operative engagement with the cam 46. The cam follower 47 operates a motor reversing switch 49 which is in operative communication with an electric motor 50 which operates a winch mechanism 51 secured to an end 16a to the arm 12a at the location 32a. The motor receives power from the lines 52 and 53 through the switch 49 and the leads 54 and 55. The winch 51 has a cable 30a operatively connected thereto. In FIGURE 3 the elements and portions designated by reference numerals having the suffix $a$ are equivalent in operation to the corresponding portions of FIGURES 1 and 2 that do not have the suffix affixed thereto.

In operation of the embodiment of FIGURE 3, the cam 46 through the follower 47 operates the switch 49 which causes the motor 50 to rotate the winch mechanism 51 in a direction indicated by the cam. Thus, the cable 30a is lengthened or shortened in accordance with a signal which is controlled by the essentially vertical motion of the arm 18a about the pivot 22a, permitting the operating head to deviate from an ellipsoidal path. Utilizing such an apparatus, a wide variety of configurations are possible including cylindrical structures or enclosures, distorted ellipses structures having ogival form, and the like, dependent upon the cam configuration selected.

The apparatus in accordance with the present invention is successfully employed for the preparation of foam buildings, the positioning of bricks and the like structural elements with a high degree of accuracy, the accuracy being primarily dependent on employing a relatively flexible and non-stretching cable such as the cable 30 or 30a. This is readily accomplished by utilizing a metal control cable composed of a plurality of relatively fine wires.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention excepting as it is set forth and defined in the hereto appended claims.

What is claimed is:
1. An apparatus for the preparation of structures of circular cross section which comprises in cooperative combination
   a means for guiding the deposition of building material in a generally dome-like configuration, the apparatus having
   a centrally pivoted arm which is adapted to be pivoted within a solid angle generally commensurate with the surface of the desired structure, the improvement which comprises
   a material dispensing head slidably mounted upon the arm,
   a cable secured to a base supporting the arm, the base being rotatable about the axis of generation of the structure, the cable being secured to the base at at least two places and being movably secured to the material dispensing head.
2. The apparatus of claim 1 wherein the pivotable arm has a first end and a second end, the first end being located and pivoted at the axis of generation of the structure.
3. The apparatus of claim 2 wherein the cable is secured to the base at at least two positions on opposite sides of the axis of generation and generally equidistant therefrom.
4. The apparatus of claim 1 including means to tension the dispensing head and maintain a stress on the cable.
5. The apparatus of claim 1 including means to vary the length of the cable during operation thereof.
6. The apparatus of claim 5 wherein the means to vary the length of the cable is controlled by the vertical angular displacement of the pivot arm.

References Cited

UNITED STATES PATENTS

| | | |
|---|---|---|
| 1,126,323 | 1/1915 | Webb et al. |
| 1,127,369 | 2/1915 | Nash. |
| 3,120,047 | 2/1964 | Crom. |
| 3,206,899 | 9/1965 | Wright. |
| 3,336,631 | 8/1967 | Smith. |
| 3,336,632 | 8/1967 | Smith. |

WILLIAM J. STEPHENSON, *Primary Examiner.*